United States Patent [19]

Rosenberg

[11] Patent Number: 5,023,755
[45] Date of Patent: Jun. 11, 1991

[54] SUPPORT SYSTEM

[76] Inventor: Rex W. Rosenberg, 1910½ Broadway, P.O. Box 2001, Great Bend, Kans. 67530

[21] Appl. No.: 506,280
[22] Filed: Apr. 9, 1990
[51] Int. Cl.$^5$ ............................................. G03B 15/02
[52] U.S. Cl. ........................................ 362/12; 362/3; 362/287; 362/419; 248/124; 248/231.3
[58] Field of Search .................... 362/3, 12, 285, 287, 362/413, 419; 248/124, 125, 231.3

[56] References Cited

U.S. PATENT DOCUMENTS

| | | | |
|---|---|---|---|
| 406,299 | 7/1889 | Overpeck | 362/12 |
| 745,052 | 11/1903 | Guimaraes | |
| 923,542 | 6/1909 | Losey | |
| 1,656,777 | 1/1928 | Dennis | 362/285 |
| 1,936,529 | 11/1933 | Taylor | 248/124 |
| 2,193,485 | 3/1940 | Kenning | |
| 3,016,225 | 1/1962 | Hughes et al. | 248/231.3 |
| 3,533,583 | 10/1970 | Azim | 248/125 |
| 3,781,535 | 12/1973 | Larson | |
| 3,851,164 | 11/1974 | Intrator | |
| 3,852,582 | 12/1974 | Lowell | |
| 4,099,221 | 7/1978 | Carrillo | |
| 4,187,531 | 2/1980 | Lowell et al. | |
| 4,210,952 | 7/1980 | Ressmeyer | |
| 4,443,837 | 4/1984 | Migliori et al. | |
| 4,470,103 | 9/1984 | Krieg | |
| 4,523,256 | 6/1985 | Small | |
| 4,524,405 | 6/1985 | Heard | |
| 4,786,022 | 11/1988 | Grieshaber | 248/231.3 |

FOREIGN PATENT DOCUMENTS 276053 8/1927 United Kingdom ................ 248/124

OTHER PUBLICATIONS

Calumet Photographic, Inc., *The Photographer's Catalog* (1986), pp. 108, 109, "Lighting Lightform".
Helix, *Helix Professional Catalog* (Winter 1986), pp. 18-22.
The Photogenic Machine Co., *Photogenic Halo* (6/30/87), 4 pages.

*Primary Examiner*—Carroll B. Dority
*Attorney, Agent, or Firm*—Litman, McMahon & Brown

[57] ABSTRACT

A support system or stand is provided for lighting components, such as light source and reflector/diffusor units, in a light system, such as the type that might be used for photography. A base assembly mounts an upright column. One or more lighting component mounting assemblies can be vertically, adjustably mounted on the column, each mounting assembly including an articulated arm for mounting a lighting component. The component mounting assemblies are adapted to permit the adjustable positioning of the lighting components in several axes of movement, and are also adapted to permit swinging and rotational movements of the lighting components.

8 Claims, 3 Drawing Sheets

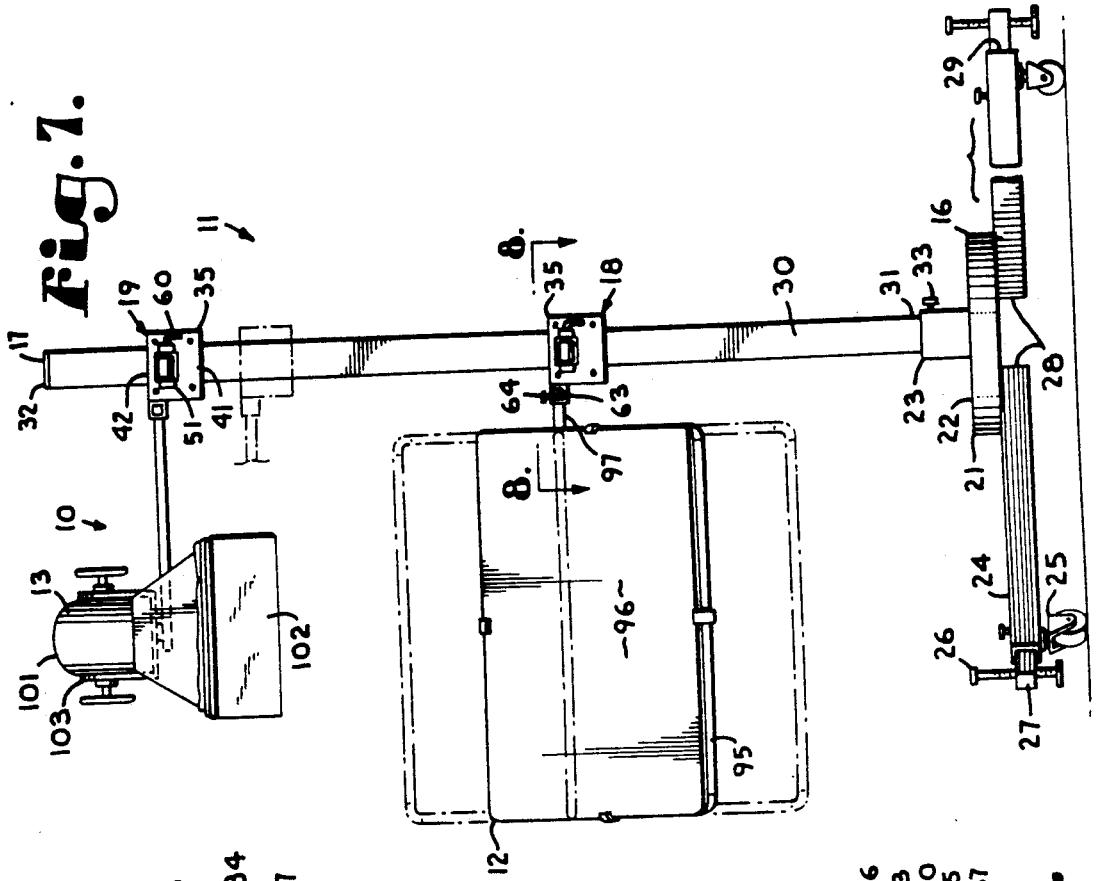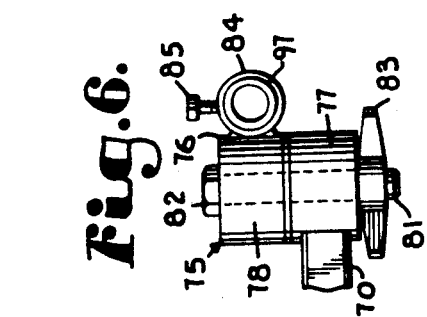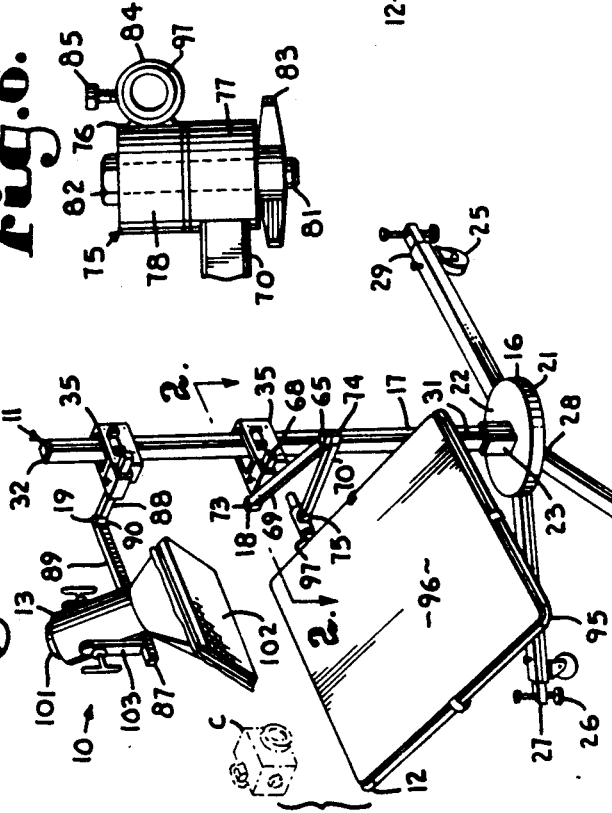

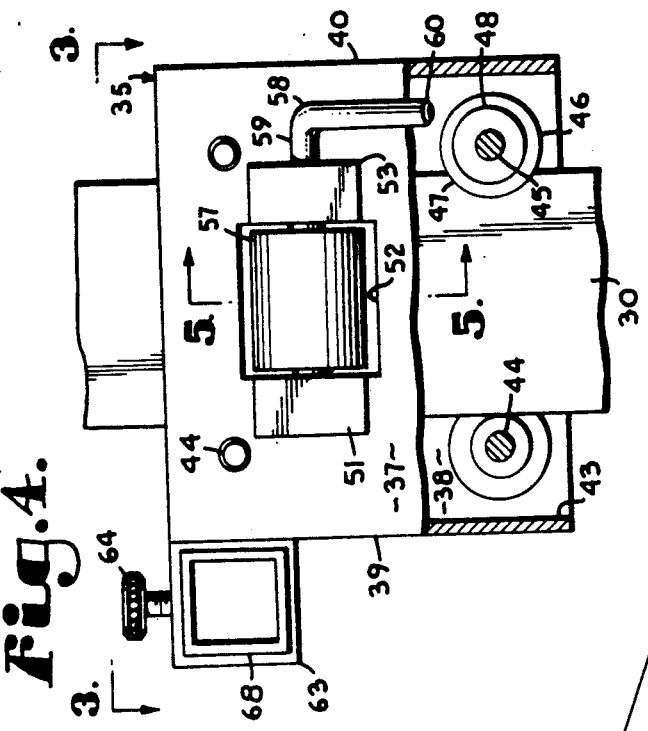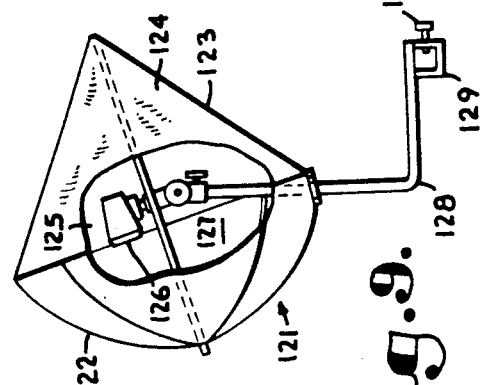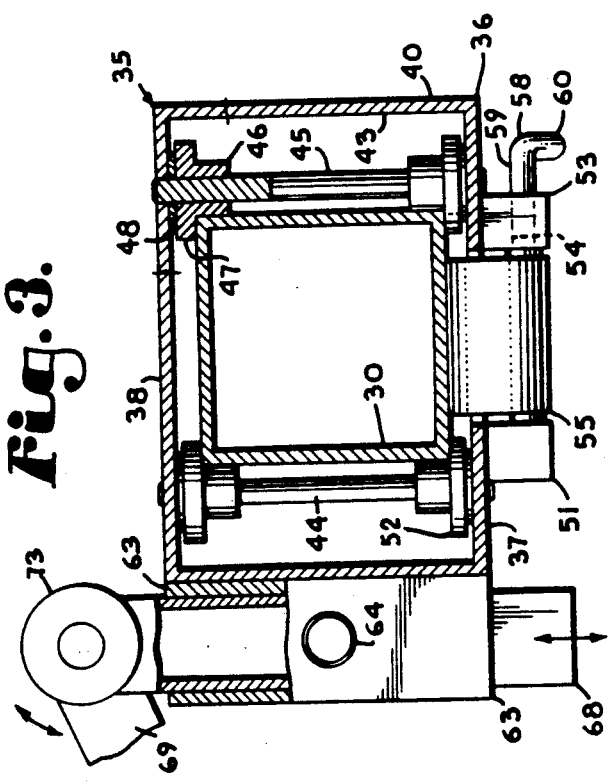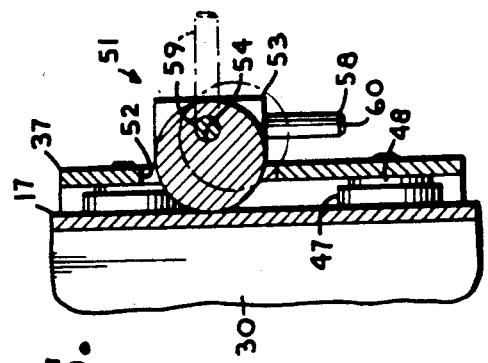

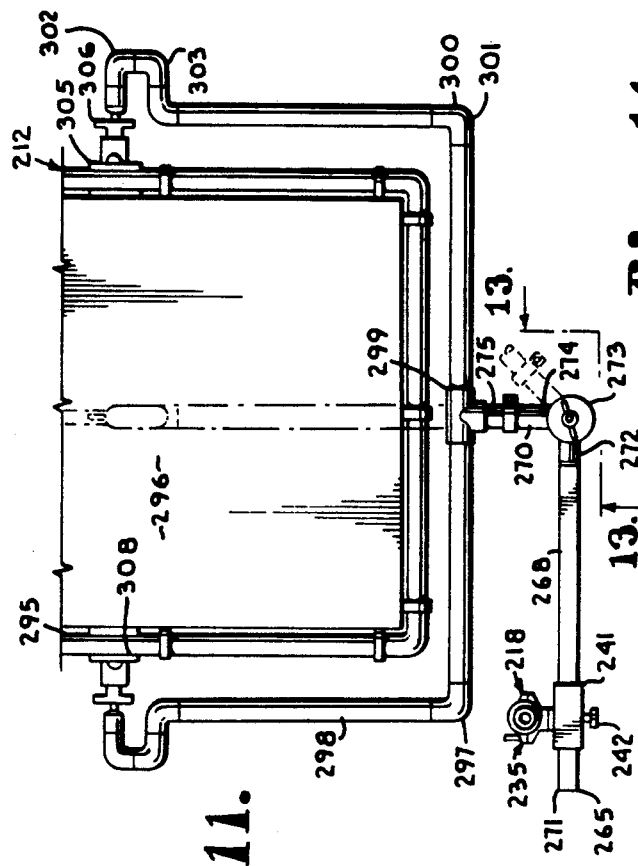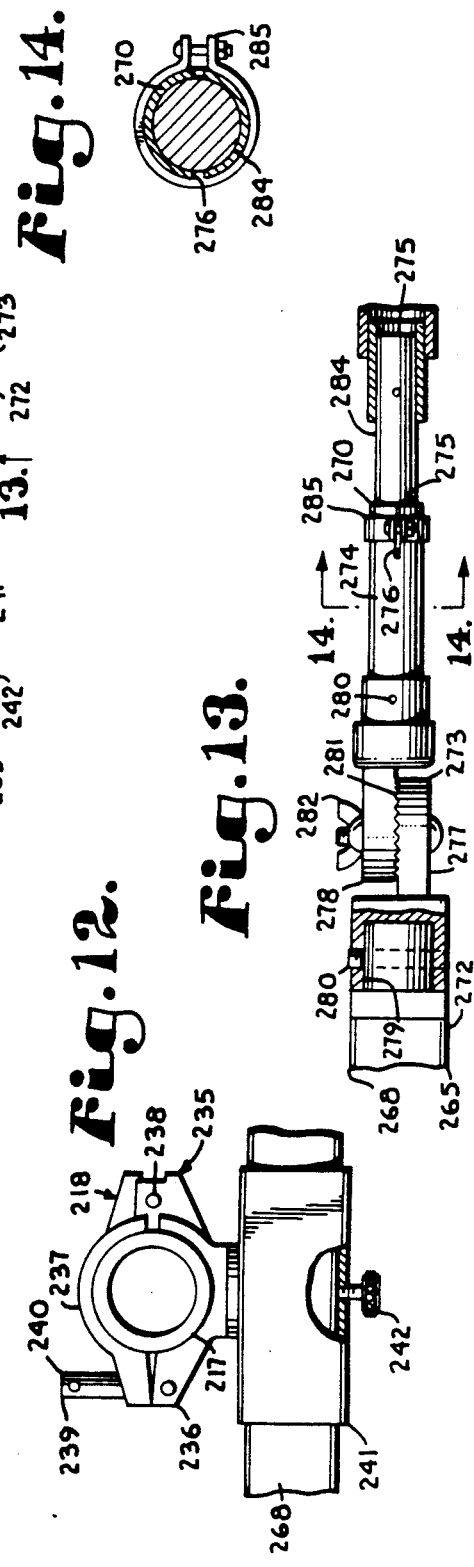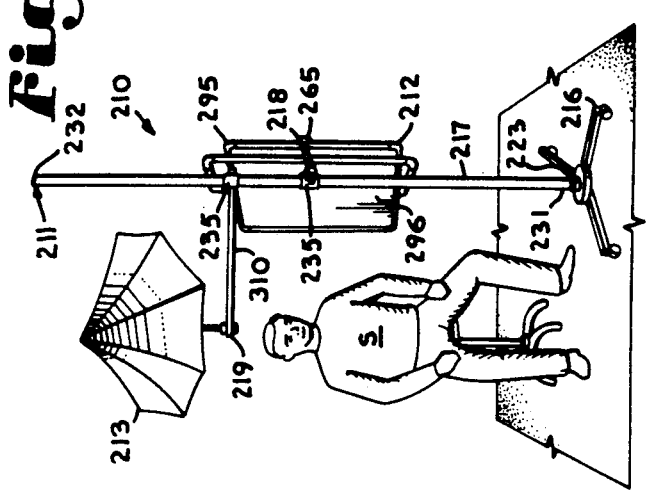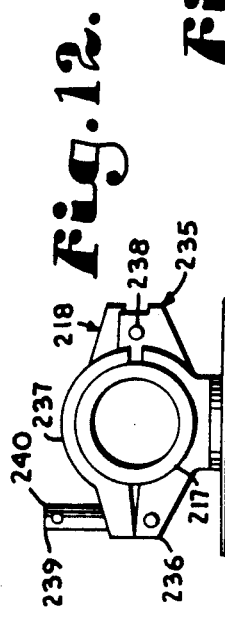

SUPPORT SYSTEM

BACKGROUND OF THE INVENTION

1. Field of the Invention.

The present invention relates generally to support structures, in particular to a support structure for a light system and specifically to a support structure for mounting light sources and reflector/diffusor panels for photographic lighting.

2. Description of the Related Art.

A variety of support structures have heretofore been devised to satisfy the requirements of various applications. For example, in the field of photography, various support structures are used to support lighting components such as light source units, reflectors and diffusors. Lighting control is very important in photography and professional photographers may consider a number of lighting factors such as direction, diffusion, shadow effects, specularity, camera angle and intensity when they prepare to photograph various subjects.

For portraiture, diffused or indirect subject lighting is often preferred because it tends to minimize shadows and thereby produces portraits wherein the subjects' features appear to be "soft" and aesthetically pleasing. Such diffused and indirect lighting effects can be achieved with various photographic lighting equipment, including diffusors and reflectors. One such device is shown in the Losey U. S. Pat. No. 923,542 and comprises a diffusor/reflector with an umbrella-like configuration mounted on a tripod. Other examples of umbrella-type reflectors and diffusors are disclosed in the Ingtrator U.S. Pat. No. 3,851,164; the Lowell et al. U.S. Pat. No. 4,187,531; the Migliori U.S. Pat. No. 4,443,837; and the Heard U.S. Pat. No. 4,524,405.

Diffusors and reflectors for photographic lighting have also been formed as flat panels of various sizes. Such panels may be constructed by fastening sheets of translucent (for diffusors) or reflective (for reflectors) material to panel frames. Diffusor/reflector panels and their materials can be obtained from sources such as Calumet Photographic, Inc. of Bensenville, Illinois.

Light source units that include diffusors and reflectors are also available. For example, the Larson "Soff Box" light source unit includes a translucent panel for diffusing light from a strobe unit. A combined reflector, diffusor and light source can be assembled by placing a strobe light in a "Photogenic Halo" reflector/diffusor, which is available from the Photogenic Machine Co. of Youngstown, Ohio. The "Photogenic Halo" device includes a translucent umbrella joined to a black umbrella with a reflective lining at the bottom perimeters of the umbrellas. The strobe light is placed in the space enclosed by the umbrellas and may be directed at either one for different lighting effects.

From the foregoing, it will be appreciated that photographers have access to and utilize a wide variety of lighting equipment. Along with various light sources, diffusors and reflectors, stands and supporting devices for photographic lighting equipment have also been devised. A tripod stand for a photographic lighting apparatus is shown in the Losey U.S. Pat. No. 923,542. The Small U.S. Pat. No. 4,523,256 shows a variable position light stand with a pair of articulated booms each mounting a lamp.

The Larson U.S. Pat. No. 3,751,535 discloses a reflective panel that can be mounted on a camera. The Ressmeyer U.S. Pat. No. 4,210,952 discloses an umbrella-type reflector and flash unit that is attached to a helmet so that the photographers hands are free to operate a camera.

The general objectives of such support structures and stands are convenience and adjustability so that the various lighting components can be positioned to achieve a variety of desired lighting effects. However, a disadvantage of many previous lighting component support structures is that they were only designed to support one component, and certain components, such as large reflector/diffusor panels, require mulitiple support structures. When multiple lighting components are required for particular lighting effects, the necessary supporting structures can become quite cumbersome and can interfere with the convenient placement of the subject.

Heretofore there has not been available a support system or stand for multiple photographic lighting components with the advantages and features of the present invention.

SUMMARY OF THE INVENTION

In the practice of the present invention, a support system or stand for lighting components in a light system is provided which includes a base assembly and a column extending upwardly therefrom. One or more lighting component mounting assemblies are placed on the column, each including a clamp subassembly adapted to lock the mounting assembly on the column at a desired elevation. Each component mounting assembly includes guide wheels adapted for rollingly engaging the column and an articulated arm which may be adjustably mounted on the clamp subassembly and which is adapted for mounting a lighting component, such as a diffusor/reflector or light source unit. The component mounting assembly permits movement of the lighting component in the x, y and z axes, and also permits swinging and rotating movements. Various combinations of lighting components can be mounted on the column using multiple mounting assemblies and the components can be placed in a wide variety of positions and orientations to achieve the desired lighting effects.

OBJECTS OF THE PRESENT INVENTION

The principal objects of the present invention are: to provide a support system or stand; to provide such a support system which is adapted for mounting multiple lighting components on a single column; to provide such a support system which is adapted for adjustably repositioning the lighting components mounted thereon; to provide such a support system which is adapted for mounting lighting components in a wide variety of positions and orientations; to provide such a support system which is easily transported to provide such a support system which occupies a minimum amount of floor space; to provide such a support system which is relatively easy to place in proximity to photographic subjects; and to provide such a support system which is economical to manufacture, efficient in operation, capable of a long operating life and is particularly well adapted for the proposed uses thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a light system including a support system or stand for photographic lighting components, which embodies the present invention.

FIG. 2 is an enlarged, horizontal, cross-sectional view of the support system taken generally along line 2—2 in FIG. 1.

FIG. 3 is an enlarged, horizontal, cross-sectional view of the support system shown in FIG. 1 and taken generally alone line 3—3 in FIG. 4, particularly showing a clamp subassembly thereof.

FIG. 4 is an enlarged, fragmentary, front elevational view of the clamp subassembly of the support system shown in FIG. 1.

FIG. 5 is an enlarged, fragmentary, vertical, cross-sectional view of the clamp subassembly taken generally along line 5—5 in FIG. 4.

FIG. 6 is an enlarged, fragmentary, side elevational view of the support structure, particularly showing an elbow or hinge thereof and taken generally along line 6—6 in FIG. 2.

FIG. 7 is a front elevational view of a light system including a support system or stand for lighting components with a modified lower clamp subassembly.

FIG. 8 is an enlarged, fragmentary, horizontal, cross-sectional view of the modified lower clamp subassembly taken generally along line 8—8 in FIG. 7.

FIG. 9 is a side elevational view of an alternative lighting component which may be mounted on the support system or stand of the present invention.

FIG. 10 is a perspective view of a light system including a support system or stand for photographic lighting components, which comprises an alternative or modified embodiment of the present invention.

FIG. 11 is a fragmentary, horizontal, cross-sectional view of the modified support system and taken generally along line 11—11 in FIG. 10.

FIG. 12 is an enlarged, fragmentary, horizontal, cross-sectional view of the modified support system, particularly showing a clamp subassembly thereof and taken generally along line 12—12 in FIG. 10.

FIG. 13 is an enlarged, fragmentary, elevational view of the modified support system taken generally along line 13—13 in FIG. 11.

FIG. 14 is an enlarged, fragmentary, cross-sectional view of the modified support system shown in FIG. 10, particularly showing a frame connector subassembly.

DETAILED DESCRIPTION OF THE PREFERRED EMBODIMENTS

I. INTRODUCTION AND ENVIRONMENT

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 10 generally designates a photographic light system comprising a structural support system or stand 11 adjustably mounting lower and upper lighting components 12, 13.

Without limitation on the generality of useful applications of the support system 11 comprising the present invention, it is described in connection with lighting components which are useful for photography. As used herein, the terminology "lighting components" means lights, reflectors, diffusers and various other equipment for illuminating photographic subjects.

II. Support System 11

The support system 11 generally comprises a base assembly 16, a column 17, a lower lighting component mounting assembly 18 and an upper lighting component mounting assembly 19.

The base assembly 16 includes a central member 21 comprising a circular plate 22 with an upwardly-open socket 23 concentrically mounted thereon. A plurality (e.g. three) of base legs 24 extend radially outwardly from the plate 22. Each leg 24 includes a proximate end 28 attached to the plate 22 and a distal end 29, the latter mounting a castor 25 and a retractable foot 26 mounted on a foot beam 27 telescopically received in a respective leg 24.

The column 17 comprises a square steel tube with sides 30 and lower and upper ends 31, 32. The column lower end 31 is received in the socket 23 and is secured therein by a set screw 33.

The base assembly 16 and the column 17 are preferably formed of material, e.g. steel, having sufficient strength to support the heaviest lighting components that will be mounted on the support system 11 with the mounting assemblies 18, 19 at their fullest extensions.

III. Lighting Component Mounting Assemblies 18, 19

The lower component mounting assembly 18 includes a column clamp subassembly 35 (FIGS. 3, 4 and 5) with a guide box 36 having a front 37, a back 38, a left or first side 39, a right or second side 40, an open bottom 41 and an open top 42. A box bore 43 extends vertically between the box bottom 41 and top 42. Upper and lower pairs of guide wheel axle receivers 44 are formed in the box front 37 and back 38 and receive the ends of respective upper and lower pairs of guide wheel axles 45.

Each guide wheel axle 45 mounts a pair of guide wheels 46 positioned within the box bore 43 adjacent to its front 37 and its back 38. Each guide wheel 46 includes an outer flange 47, with each guide wheel pair on a respective axle 45 being sized to receive the column 17 therebetween. The guide wheels 46 preferably comprise a material, such as nylon, that is adapted to rollingly engage the column 17. Washers 48 are placed between the guide wheels 46 and the respective box front 37 and back 38. The four pairs of guide wheels 46 cooperate to maintain the column 17 substantially centered within the box bore 43 and to facilitate reciprocably sliding the column clamp subassembly 35 on the column 17.

A brake 51 is mounted on the box front 37 and includes a brake opening 52 in the box front 37. On each side of the brake opening 52, a respective tab 53 extends in a forward direction from the box front 37 and includes a tab receiver 54, the tab receivers 54 being transversely aligned.

A generally cylindrical brake member 57 is mounted between the tabs 53 and fixedly receives an L-shaped brake axle member 58 with a transverse axle portion 59 journaled at its ends within the tab receivers 54 and a handle portion 60 extending at a right angle from an end of the axle portion 59. The axle portion 59 is eccentrically secured within the cylindrical brake member 57 so that rotating the brake and axle members 57, 58 causes the brake member 57 to move further into or further out of the box bore 43. For example, in solid lines in FIG. 5 the brake member 57 is shown in its locked or brake position in frictional engagement with the column 17. In phantom lines in FIG. 5 the brake member 57 is shown in its release position disengaged from the column 17. The brake member 57 is rotated between its brake and release positions by grasping the handle portion 60 and rotating the axle member 58. The cylindrical brake member 57 may comprise, for example, a resilient material such as hard rubber, which is adapted for frictional engagement with the column 17 with the brake member 57 in its locked position.

A square tubular sleeve 63 is mounted on the box 36 (e.g. its left side 39 as shown) and threadably receives a set screw 64. The lower lighting component mounting assembly 18 includes a double articulated lower arm subassembly 65 with proximate, intermediate and distal sections 68, 69 and 70. The proximate section 68 is telescopically and slidably received in the sleeve 63 for fore-and-aft adjustment. The arm subassembly 65 includes an inner hinge or elbow 73 pivotally interconnecting the proximate and intermediate sections 68, 69; a middle elbow 74 pivotally interconnecting the intermediate and distal sections 69, 70; and an outer elbow 75 mounted on the outer end of the distal section 70.

The outer elbow 75 is shown in detail in FIG. 6; the inner and middle elbows 73, 74 may be of generally comparable construction. The outer hinge or elbow 75 includes a body 76 comprising lower and upper halves 77, 78 interconnected by a hinge pin 81 which may comprise a bolt 82 extending through the body halves 77, 78 and mounting a clamp nut 83. The hinge body halves 77, 78 are generally cylindrical and with the clamp nut 83 loosened are rotable about an axis extending through the bolt 82. The clamp nut 83 may be tightened on the bolt 82 for firmly clamping the hinge or elbow 75 together. The lower hinge body half 77 is mounted on the end of the arm distal section 70 and the upper body half 78 mounts a generally cyclindrical sleeve 84 which threadably receives a set screw 85.

The upper lighting component mounting assembly 19 includes a column clamp subassembly 35 and an upper arm subassembly 87, the latter including a proximate arm section 88 adapted to be slidably and telescopically received in a respective column clamp subassembly sleeve 63 for fore-andaft adjustment with respect to the column 17. A distal arm section 89 is interconnected to the proximate arm section 88 by a hinge or elbow 90 which is similar in construction and operation to the elbows 73, 74 and 75.

Lighting Components 12, 13 and 121.

A variety of components can be mounted on the support system or stand 11 to achieve a variety of objectives, such as providing light for photography. Common lighting components that are used in photography include light source units, i.e. flash units, continuous units, etc.; and light control units, e.g. reflector and diffusor panels. The light units may include, for example, integral diffusors, reflectors and lenses. Lighting control is an important aspect of professional photography, and the variety of lighting effects that photographers seek to obtain may be as wide as the variety of subjects that they photograph.

The lower lighting component 12 is shown which comprises a generally rectangular framework 95 mounting a fabric cover 96, which may comprise either reflective material for a reflector unit or translucent material for a diffusor unit. The framework 95 includes a mounting tube 97 extending from one side and rotatably and telescopically slidably receivable in the sleeve 84 of the outer elbow 75. The lower lighting component or panel 12 may be clamped in position with the set screw 85. Suitable reflective and translucent fabrics for the cover 96, and clips for mounting it on the framework 95 can be obtained from Calumet Photographic, Inc. of Bensenville, Ill.

The upper lighting component 13 comprises a light source unit, for example a Larson "Soff" box with a light unit 101, a diffusor panel 102 and a clevis-type mounting bracket 103 which is slidably mounted on the distal arm section 89.

A lower arm subassembly 110 is shown in FIGS. 7 and 8 and comprises an alternative to the lower arm subassembly 65 shown in FIGS. 1 and 2. The lower arm subassembly 110 comprises a single arm section 111 telescopically slidably received in the column clamp subassembly sleeve 63 and mounting an elbow or hinge 112 which is substantially identical to the outer elbow 75. The elbow 112 includes a generally cylindrical sleeve 113 for telescopically and rotatably receiving the lighting component mounting tube 97, which may be secured by a set screw 114.

FIG. 9 shows an upper lighting component 121 comprising an alternative to the "Soff" box upper lighting component 19. The upper lighting component 121 shown in FIG. 9 is a "Photogenic Halo" light source unit, which is available from the Photogenic Machine Co. of Youngstown, Ohio. The upper lighting component 121 includes a translucent front umbrella 122 connected to a back umbrella 123 with a black, opaque outer layer 124 and a reflective, silver lined inner layer or surface 125 (e.g. black cloth with a reflective silver lining). A light unit (e.g. strobe, flash or continuous) 126 is mounted in an interior space 127 formed between the umbrellas 122, 123 and may be directed towards either the front umbrella 122 or the back umbrella 123. The upper lining component 121 includes a mounting bracket 128 with a sleeve 129 adapted to telescopically receive the distal arm section 89 of the upper arm subassembly 87, and may be clamped thereto with a set screw 130.

Operation

The support system or stand 11 is adapted to support a variety of components, such as the lighting components 12, 13 and 121, in various positions and orientations relative to each other and relative to a subject 5. Thus, a wide variety of lighting effects can be achieved to photograph a wide variety of subjects to advantage.

FIG. 1 shows a configuration for a lighting effect which is referred to as "butterfly" lighting. The subject (S in FIG. 1) is positioned in front of the lighting system 10 and a camera C is positioned behind the lighting system 10 so that its view is between the upper and lower lighting components 12, 13. Part of the light from the upper lighting component 13, which comprises a light source, is directed downwardly to the subject S and part of the light is reflected by the lower lighting component 12, which comprises a reflector panel, upwardly onto the subject S. Thus, the subject S is lighted from above and below with relatively diffused light.

The butterfly lighting technique is particularly desirable for portraiture, because lighting a subject with diffused lighting from above and below tends to minimize harsh shadows and thereby produces a soft, pleasing effect which is particularly appropriate for portraiture. The lighting effect can be varied practically infinitely by adjusting the relative angles and positions of the lighting components 12, 13. To this end, the column clamp subassemblies 35 are vertically movable on the column 17. The upper and lower arm subassemblies 65, 87 are longitudinally movable front-and-back. The components 12, 13 are transversely movable relative to the lower and upper arm subassemblies 65, 87, which are both articulated for adjustable swinging movement of the components 12, 13. The pivotal axes of the lower and upper arm subassemblies 65, 87 are generally vertical through the hinge pins 81. The lower arm subassembly 65 is articulated at three elbows 73, 74 and 75 for transverse extension and retraction of the lower component 12 relative to the column 17 as shown in FIG. 2 (retracted position in solid lines, extended position in broken lines).

The lighting components 12, 13 are rotatably mounted on the lower and upper arm subassemblies 65, 87 respectively; the lower component 12 due to the pivotable relationship between its mounting tube 97 and the sleeve 63, and the upper component 13 by means of its mounting bracket 103.

A lighting technique similar to the butterfly lighting technique described above can be achieved with the light system 10 by placing the lighting components 12, 13 at approximately the same level and orienting the reflector/diffusor cover 96 in a first vertical plane and a light unit diffusor panel 102 in a second vertical plane. The subject would be placed in front of the lighting components 12, 13 in a position to receive direct, diffused light from the light source component 13 and reflected light from the reflector/diffusor component 12. The camera could be placed behind the lighting components 12, 13 for a view of the subject between them.

Yet another useful configuration of the light system 10 involves clipping a translucent cover on the framework 95 and directing the light source component 13 downwardly through the reflector/diffusor (in this case functioning as a diffusor) component 12 for illuminating a subject placed beneath the reflector/diffusor component 12.

Other exemplary configurations of the light system 10 include overhead lighting techniques with a light source shining downwardly through a translucent panel and various combinations of light sources and reflector/diffusor panels, including multiples of each type.

In addition to the aforementioned advantages of flexibility and adaptability for variously configuring the light system 10, the support system 11 cooperates with the components 12, 13 to provide a complete light system 10 on a single base assembly 16 and a single column 17. Thus, the complete system 10 has a relatively small "footprint" and requires a minimal amount of floor space. An important advantage of this feature is that it permits the light system 10 to be placed very close to a subject or a camera tripod or camera stand, and otherwise permits placement in areas that might be too small for two reflector/diffusers mounted on tripods. For example, the light system 10 could be rolled into place between a tripodmounted camera and a portrait subject, or it can be used to illuminate a subject lying on a table by rolling its legs 24 under the table and locating the reflector/diffusor panel over the table. The single-base and single-column features of the support system 11 also facilitate its relocation, set-up and transportation.

Modified or Alternative Embodiment

A light system 210 including a support system or stand 211 comprising a modified or alternative embodiment of the present invention is shown in FIGS. 10-14 and generally includes a base assembly 216, a column 217, a lower lighting component mounting assembly 218, and an upper lighting component mounting assembly 219. The column 217 comprises a round tubular member with a lower, threaded end 231 and an upper end 232. The column lower end 231 is threadably connected to the base 216 by a clamp nut assembly 223.

The lighting component mounting assemblies 218, 219 include column clamp subassemblies 235 each comprising inner and outer jaws 236, 237 hingedly connected at one side by a pivot pin 238 and clamped together at the other side by a threadably-actuated clamp key mechanism 239 adapted to close the jaws 236, 237 in a clamping relationship on the column 217. The clamp key mechanism 239 includes a key 240 which can be grasped and turned to either tighten or loosen the clamp subassembly 235. The inner jaw 236 mounts a square, tubular sleeve 241 which threadably receives a set screw 242.

The lower lighting component mounting assembly 218 includes a lower arm subassembly 265 including proximate and distal sections 268, 270 interconnected by an elbow or hinge 273. The proximate section 268 includes a proximate or inner end 271 which is slidably and telescopically received in the sleeve 241 and a distal or outer end 272 with a cylindrical configuration. The distal arm section 270 includes a proximate or inner end 274 and a distal or outer end 275, the latter being longitudinally slotted, as at 276.

The elbow 273 includes proximate and distal halves 277, 278 with sockets 279 receiving the proximate arm section outer end 272 and the distal arm section inner end 274 respectively, secured with pins 280. The hinge halves 277, 278 include knurled faces 281 which are clamped together by bolt-and-wing nut assemblies 282 to selectively resist articulation between the arm sections 268, 270.

The distal arm section outer end 275 receives a connecting shaft 284, which can be secured therein by a split-ring, angular clamp 285 for tightening the distal arm section outer end 272 on the connecting shaft 284.

A lower lighting component 212 includes a rectangular framework 295 mounting a fabric cover 296. A U-shaped mounting bracket includes lengths of tubing 298 interconnected by a tee connector 299 at the middle of the bracket 297 and L-connectors 300 connecting the tubing 298 at corners 301 of the bracket 297. The mounting bracket 297 includes opposite ends 302 each forming a hook or bight portion 303, which can be constructed of L-connectors 300.

Sleeve-type tube connectors 305 are mounted on the mounting bracket ends 302 by suitable threaded clamp nut mechanisms 106 which can be loosened and tightened by hand to selectively permit rotation of the sleeve-type tube connectors 305 with respect to the mounting bracket 297. The sleeve-type tube connectors 305 include side opening slots 308 adapted to receive the framework 295, which can be resiliently snapped into place.

The upper lighting component mounting assembly 219 can include a column clamp subassembly 235 and a square, tubular upper arm subassembly 310 for mounting an upper lighting component 213.

In operation, the modified support system or stand 211 can function in a lighting system 210 in a manner similar to the support system or stand 11, with similar advantages of flexibility and utility for creating various lighting conditions. For example, FIG. 10 shows a subject S positioned for a portrait with an upper lighting component 213 like the previously described upper lighting component 121 and a lower lighting component 213 like the previously described lower lighting component 12. The lower lighting component 212, as shown in FIG. 10, is positioned to the side of the subject S to achieve a desired lighting effect with the subject S being partially lit by reflected light from the side and partially lit by light from the upper lighting component 213 located above.

It is to be understood that while certain forms of the present invention have been illustrated and described herein, it is not to be limited to the specific forms or arrangement of parts described and shown.

What is calimed and desired to be secured by Letters Patent is as follows:

1. A photographic lighting system, which comprises:
   (a) a base assembly including:
      (1) a central base member;
      (2) a plurality of base legs each having a proximate end attached to said central member and a distal end; and
      (3) a plurality of castors each mounted on a respective leg distal end;
   (b) a generally vertical column includign a lower end attached to said base central member and an upper end;
   (c) upper and lower arm assemblies, each including:
      (1) a column mounting subassembly including a barcket with a receiver adapted to slidably receive said column and a clamp having a clamp position in frictional engagement with said column whereby said column mounting subassembly is clamped to said column and in a release position disengaged from said column whereby said column mounting subassembly is freely slidable on said column;
      (2) an arm having a proximate section connected to said column mounting subassembly and a distal section; and
      (3) an elbow including a first portion mounted on said arm proximate section, a second portion mounted on said arm distal section and a hinge pin pivotally clamping said body first and second portions together;
   (d) a lower lighting component mounted on said lower arm assembly distal section;
   (e) an upper lighting component mounted on said upper arm assembly distal section; and
   (f) said lower lighting component comprising a translucent panel.

2. A photographic lighting system which comprises:
   (a) a base assembly;
   (b) a generally vertical column including a lower end attached to said base assembly and an upper end;
   (c) upper and lower arm assemblies, each including:
      (1) a column mounting subassembly including a bracket with a receiver adapted to slidably receive said column and a clamp having a clamp position in frictional engagement with said column whereby said column mounting subassembly is clamped to said column and in a release position disengaged from said column whereby said column mounting subassembly is freely slidable on said column;
      (2) an arm having a proximate section connected to said column mounting subassembly and a distal section; and
      (3) an elbow pivotally clamping said arm proximate and distal sections together;
   (d) a lower lighting component mounted on said lower arm assembly distal section;
   (e) an upper lighting component mounted on said upper arm assembly distal section; and
   (f) mounting means for mounting one of said lighting components on a respective arm distal section for rotation about a rotational axis extending generally parallel with respect to said arm assembly distal section.

3. The photographic lighting system according to claim 2 wherein:
   (a) said column has a square cross-sectional configuration.

4. The system according to claim 3 wherein each said column mounting subassembly includes:
   (a) opposed pairs of roller assemblies rollingly engaging opposite sides of said column.

5. The photographic lighting system according to claim 2 wherein:
   (a) said lower lighting component comprises a reflective panel.

6. The photographic lighting system according to claim 2 wherein:
   (a) said lower lighting component comprises a translucent panel.

7. The photographic lighting system according to claim 2 wherein:
   (a) said upper lighting component comprises a light source.

8. The support system according to claim 2 wherein each said engagement member comprises:
   (a) a generally cylindrical roller;
   (b) an axle fixedly connected to and extending eccentrically through said roller, said axle being rotatably mounted on said bracket;
   (c) a handle fixedly connected to and extending from said axle; and
   (d) said roller, axle and handle being rotatable between a first, release position disengaged from said column and a second, clamp position frictionally engaged in said column whereby said mounting assembly is clamped thereto.

* * * * *